P = Ratio of object-screen to source-screen distance

INVENTOR –
Jesse WM. DuMond

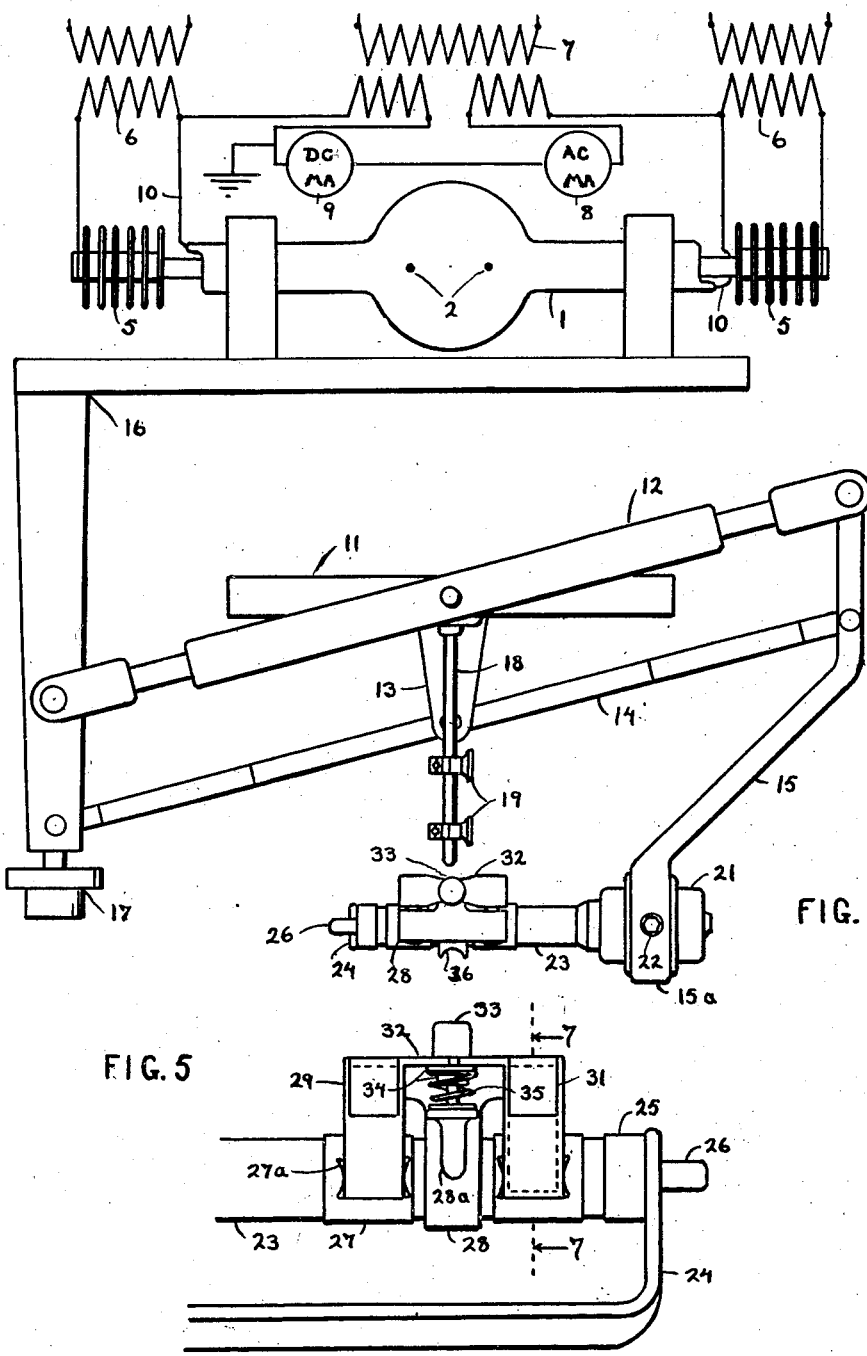

Dec. 15, 1936.  J. W. M. DU MOND  2,063,989
STEREOFLUOROSCOPIC APPARATUS
Filed Feb. 8, 1932  4 Sheets-Sheet 3
FIG. 6
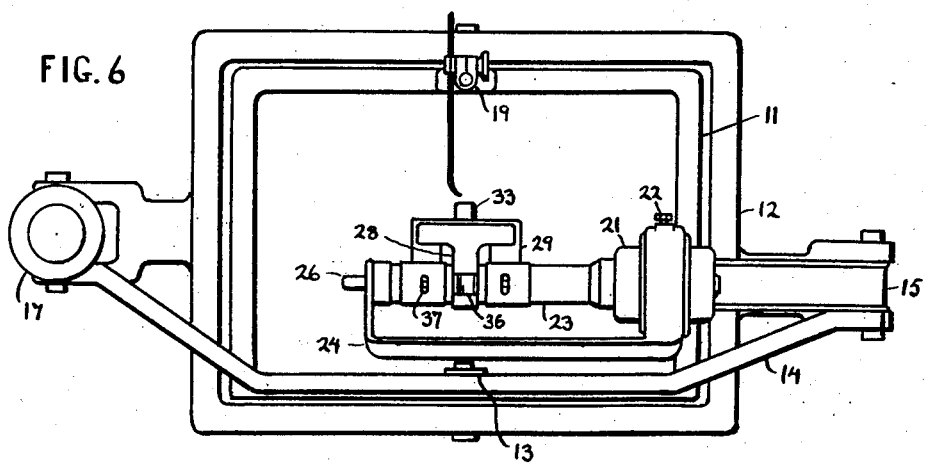
FIG. 7
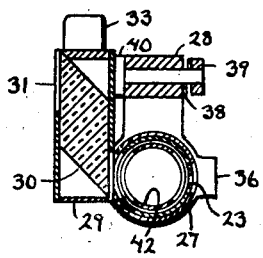
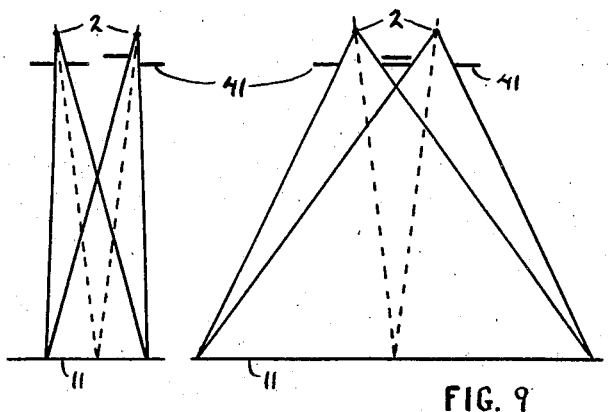
FIG. 9
FIG. 8
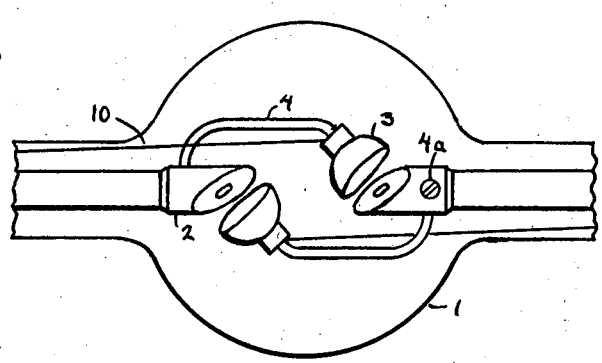
INVENTOR
Jesse W. M. DuMond Dec. 15, 1936.  J. W. M. DU MOND  2,063,989
STEREOFLUOROSCOPIC APPARATUS
Filed Feb. 8, 1932  4 Sheets-Sheet 4

INVENTOR -
Jesse W.M. DuMond

UNITED STATES PATENT OFFICE 2,063,989

STEREOFLUOROSCOPIC APPARATUS

Jesse W. M. Du Mond, Pasadena, Calif.

Application February 8, 1932, Serial No. 591,654

10 Claims. (Cl. 250—34)

My invention relates to improvements in stereofluoroscopic X-ray apparatus; and the objects of my improvement are to afford substantially distortionless stereoscopic projection of Röntgen images, to provide for accurate measurement of such images and to simplify the construction and manipulation of the apparatus.

Figure 1:
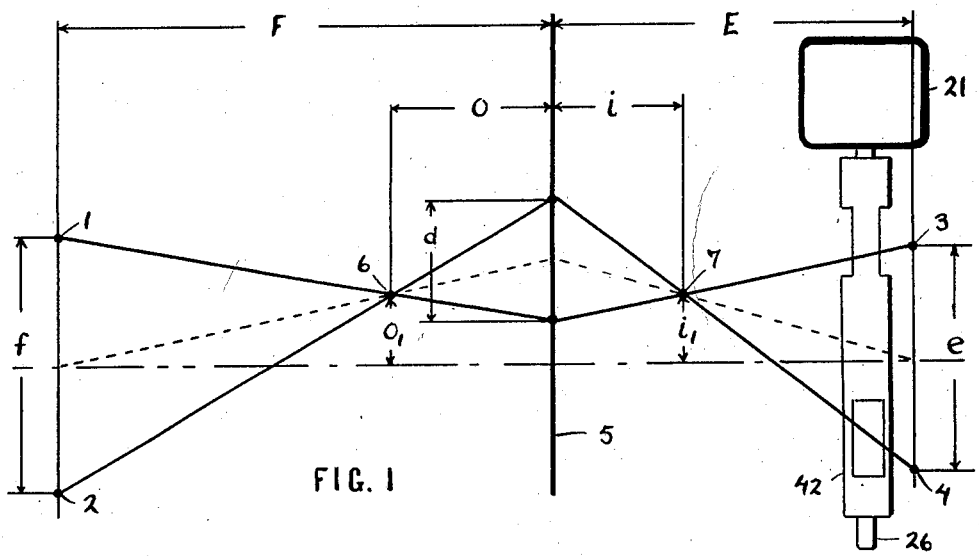

Some mathematical considerations are necessary to an adequate understanding of the problems involved in eliminating distortion in stereofluoroscopic images. Fig. 1 of the accompanying drawings is a schematic illustration of a stereofluoroscopic arrangement, in which 1 and 2 represent the focal points of two separate X-ray sources, 3 and 4 the pupils of the eyes of an observer, 5 a fluoroscopic screen, 6 an object to be examined, and 7 the stereoscopic image of the object.

Having reference to the lettering of Fig. 1, let:

$r = \dfrac{e}{f} = \dfrac{\text{interpupillary distance}}{\text{interfocal distance}}$ (given)

$p = \dfrac{o}{F} = \dfrac{\text{object-screen distance}}{\text{tube-screen distance}}$ (given)

$i = $ image-screen distance $x = \dfrac{E}{F} = \dfrac{\text{eye-screen distance}}{\text{tube-screen distance}}$ (to be found)

$x' = $ that value of $x$ which makes $\dfrac{i}{o} = 1$ $S_1 = $ the longitudinal scale ratio $= \dfrac{\text{small distance in depth of image}}{\text{corresponding distance in depth of object}}$ (to be found)

$S_2 = $ the lateral scale ratio $= \dfrac{\text{small distance measured laterally in image}}{\text{corresponding distance measured in object}}$ (to be found)

The rays from the two images on the screen to the two eyes cross at the image and form two similar triangles. Also the rays from the two tubes cross through the object and form two similar triangles. The base-line $d$ is common to the two systems. It is easy to show that:

$$\dfrac{E-i}{F-o} = r\dfrac{i}{o} \qquad (1)$$

In order that there shall be no depth distortion, we must have $$\dfrac{i}{o} = 1$$

For this condition, on solving for $$\dfrac{E}{F} = x'$$

we obtain:

$$x' = r + p(1 - r)$$

This $x'$ is the ratio of the eye-screen distance to the tube-screen distance which must obtain if there is to be no depth distortion. It depends on $p$, the relative position of the object. Hence, it is evident that for an extended object the distortion cannot be eliminated over all parts unless $r = 1$.

If we solve Equation (1) for $$\dfrac{i}{o}$$

without the restriction that $$\dfrac{i}{o}$$

shall equal unity we obtain:

$$\dfrac{i}{o} = \dfrac{x}{r + p(1-r)} \qquad (2.1)$$

The longitudinal scale ratio $S_1$ in the notation of the differential calculus is $$\dfrac{di}{do}$$

that is to say, the ratio of two corresponding small elementary lengths measured in the direction of depth, one being in the image and the other in the object. To obtain this we have only to differentiate the Equation (2.1) according to the rules of the differential calculus regarding $i$ and $o$ as the variables, but remembering that $p$ is a function of $o$, namely $$\dfrac{o}{F}$$

Thus the longitudinal scale ratio $S_1 =$ $$S_1 = \dfrac{di}{do} = r\dfrac{x}{(r + p(1-r))^2} \qquad (3)$$

By similar triangles it is evident that $$\dfrac{i_1}{o_1} = \dfrac{F}{E}\dfrac{E-i}{F-o}$$

Whence $$\dfrac{i_1}{o_1} = \dfrac{r}{x}\dfrac{i}{o}$$

but $$\dfrac{i}{o} = \dfrac{x}{r + p(1-r)}$$

therefore $$\dfrac{i_1}{o_1} = \dfrac{r}{r + p(1-r)} \qquad (4)$$

Figure 2:
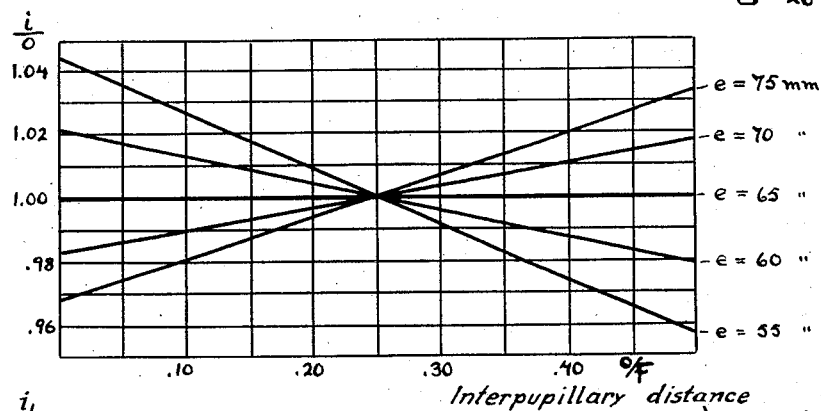
Figure 3:
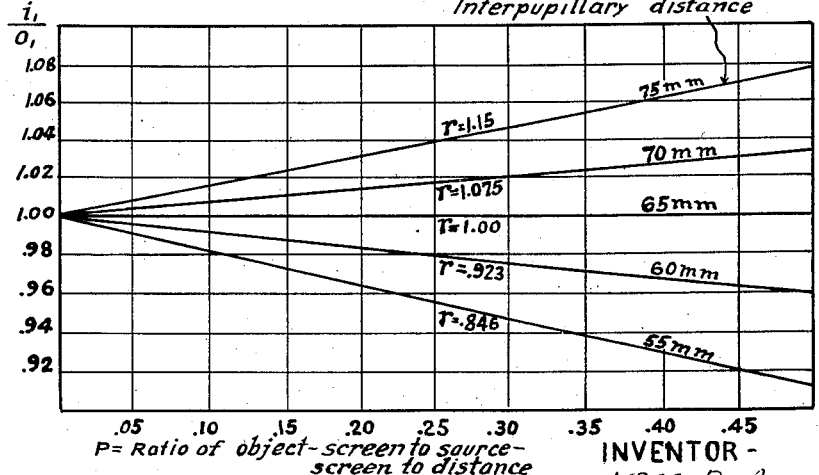

Fig. 2 shows the curves of depth distortion for five typical cases of interpupillary distance ranging from 55 to 75 mm. Fig. 3 shows the curves of lateral distortion for the same cases of interpupillary distance; both of these curves are computed for a value of $x$ such that $$\dfrac{i}{o}$$

shall be unity when the object is one-fourth as far from the screen as are the focal spots ($p=0.25$). A fixed interfocal distance of 65 mm. is assumed. It is also assumed that the center of the object to be pictured is one quarter as far from the screen as are the focal spots. It is evident that for an observer with an interpupillary distance of 55 mm. the lateral dimensions of the image will be only about ninety-five percent natural scale, even when the depth distortions have been minimized by proper choice of the ratio $x$. Similarly, for an observer with an interpupillary distance of 75 mm. the lateral dimensions will be magnified to about four percent greater than natural scale.

From all of the foregoing it follows that distortionless stereoscopic projection can be achieved only by keeping F equal to E and $f$ equal to $e$. Means to this end are suggested in U. S. Patent #1,735,726 to F. Bornhardt. These include a mechanism for holding F always equal to $E(x=1)$, and for varying the interfocal distance to match the interpupillary distance of the observer. To the latter end in the Bornhardt patent two separate X-ray tubes are to be employed, and the spacing of these tubes from one another is to be made adjustable in such manner as to provide the necessary range of interfocal distances. This suggested solution of the problem is however impracticable, for the simple reason that it is practically impossible to build X-ray tubes of the requisite power small enough in diameter to permit of interfocal spacing equal to interpupillary spacing. The limiting factor is the "cold electron emission", which takes place even in the highest vacua. The minimum diameter of tube envelope compatible with the requisite electrical functioning is greater than human interpupillary distances.

In view of the above considerations, my invention includes the use of a duplex tube with fixed interfocal spacing, together with an interpupillary compensator with an adjustment adapted to give the eye pupils an optically effective virtual separation equal to the given interfocal distance. It also includes means for holding the ratio $x$ equal to 1. It further includes a novel shutter adapted to exclude parallax and other errors of vision, and also means for accurately calipering the stereoscopic image. Still further advantages and novel features will appear from the following description.

Figure 10:
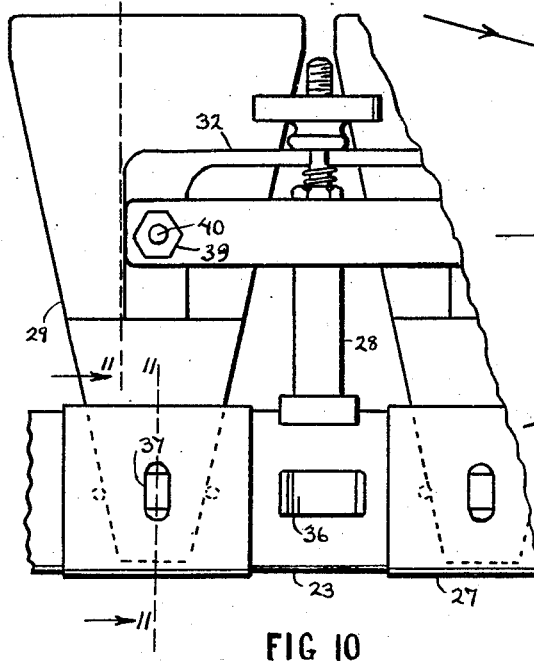

Fig. 4 is a top view of a representative embodiment of my invention. Fig. 5 is an enlarged rear view of the interpupillary compensator mechanism. Fig. 6 is a front elevation of the device. Fig. 7 is a partial view of the compensator and shutter mechanism. Fig. 8 is an enlarged detail view of the tube, and Fig. 9 shows schematically a preferred stop arrangement for narrowing the X-ray beams. Fig. 10 shows in front elevation and Fig. 11 in section an alternative compensator design. Finally, Fig. 12 illustrates diagrammatically the shutter action. Similar numbering refers throughout to similar parts.

Referring now to Fig. 4, 1 is a duplex X-ray tube with focal spots 2, coolers 5 and filament leads 10 connected to the filaments associated with the respective focal spots. The filament current supply is derived from the two transformers 6, the high tension supply from the transformer with split secondary 7. Between the two secondary windings are connected a D. C. and an A. C. milli-ammeter. The latter indicates the total current supplied to the two filaments, since its deflection is indifferent to the direction of flow of current. The D. C. instrument should preferably be of the type with zero in the middle of the scale, permitting the indication of current in either direction. The tubes are balanced when this meter gives zero deflection. As the instruments are grounded, they present no danger to the operator.

It is of course important that the two focal spots should be of nearly equal intensity, although the requirements are not exacting. The filaments are virtually connected in parallel (through their respective transformers) to the same voltage source, and there is therefore a favorable tendency toward stability of balance due to the positive thermal coefficient of tungsten filaments. A single filament control rheostat serves to establish the balance, and it is hereby necessary to observe only a single instrument for zero reading.

The tube is mounted on the support 16. This carries a system of aperture stops (to be later described) which is controlled by the knobs 17. To 16 are linked the arms 12 and 14. To the outer ends of these arms is linked the arm 15. This in turn carries the four-pole synchronous motor 21, which drives the shutter mechanism requisite to stereofluoroscopic viewing. The motor is mounted in an annular opening in the arm 15, and is held in position by the set-screw 22.

The shutter is brought into phase with the X-ray sources by rotating the motor in its annular opening. The phasing process is as follows: A diaphragm opaque to X-rays is placed over one of the sources. The motor is then rotated bodily until the eye on the same side as the obscured source sees a perfectly dark field all over the screen. The set-screw 22 is then clamped down. This method is far superior to that of disconnecting one of the tubes electrically, as in the latter case the consequent dissymmetry of load shifts the phase of the single operating tube away from that which it will have when both tubes are operating.

The arm 12 in its middle portion takes the form of a rectangular frame, in which is pivoted the fluorescent screen 11. To this screen is affixed the tongue 13, which is linked to the middle of the arm 14.

The arms 12, 13, 14, 15, together with support 16 form a double parallelogram system which serves at once to keep the screen 11 equidistant from the focal spots and the eyes of the observer (while permitting the usual variation of tube-screen distance), and to keep the screen at all times parallel to the X-ray tube and the shutter.

Figures 4, 5, 6 and 7 show an embodiment of the interpupillary compensator. The shutter casing 23 carries a support 28, to which are pivoted the prism casings 29. The pivotal members 40 are affixed to the two casings 29, and are retained in rotatable relation to the support 28 by means of the nuts 39 and the spring washers 38. The spacing of the pivots is equivalent to the interfocal spacing of the tube. In the casings 29 are carried the prisms 30, so disposed that the center of the upper plane reflecting surface of each prism coincides with the pivotal axis, and that the lower plane reflecting surface of each prism falls within the field of vision of the observer's eye. These features are best illustrated by Fig. 7.

Referring now to Fig. 5, the casings 29 are provided with inwardly projecting tongues 32, which pass under the head of a thumbnut 33. This thumbnut is provided with a shank which is threaded into the boss 28a of the support 28. Spring 35 and washer 34 press tongues 32 upward against the thumbnut. On turning the thumbnut, the lower planes of reflection of the prisms are rotated through a small arc about the axes of the upper planes. On casing 23 are the two sliprings 27. These have openings 27a, into which fit the casings 29. Thus the sliprings move with the lower reflective planes as the thumbnut is adjusted. Opposite to openings 27a, the rings are provided with slots 37 (see Figs. 6 and 7). The observer sees the screen through these slots, and as they are but slightly wider than the pupils he must adjust their spacing to interpupillary distance to obtain a clear view.

The bridge of the observer's nose rests in the nosepiece 36. This fixes his eyes with respect to the eye-slots 37 and guards against errors of parallax. The pivots of the parallelogram system should have sufficient friction to guard against accidental slippage. Under these circumstances the observer finds no difficulty in maintaining his eyes in fixed relation to the optical system.

Figure 11:
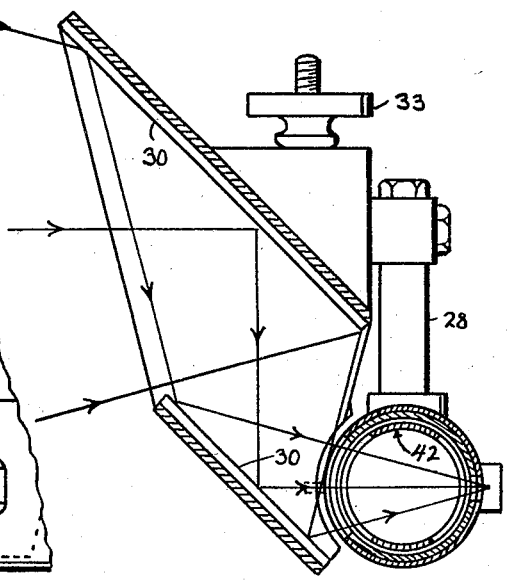
Figure 12:
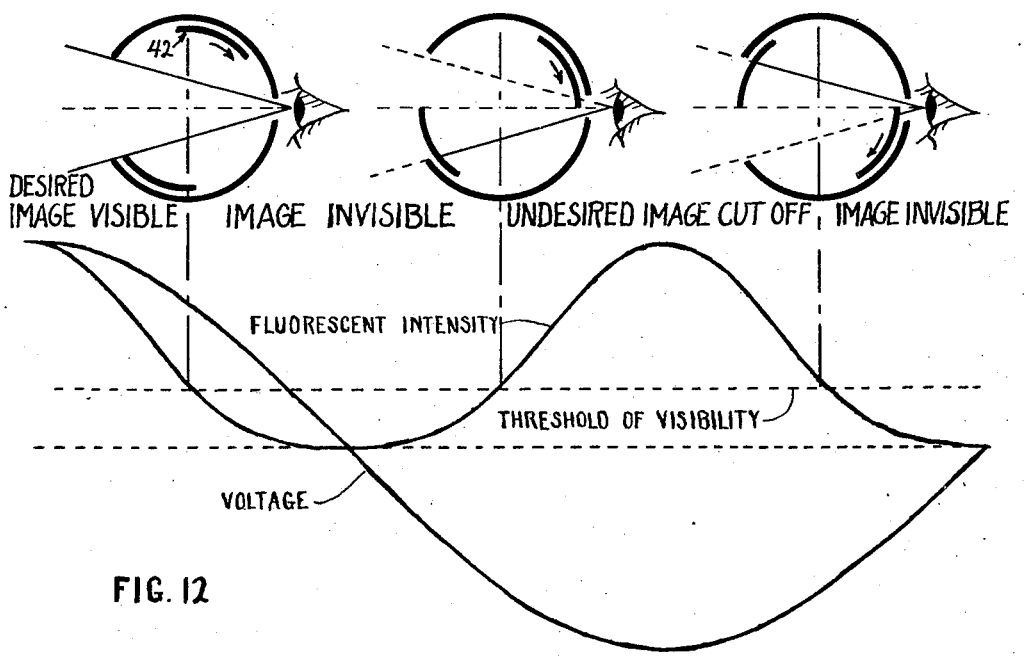

An alternative compensator design is shown in Figures 10 and 11, of which the first is a front elevation and the second a section on the dotted lines 11 of Fig. 10. The functioning of this arrangement is throughout similar to the one just described, but instead of prisms four mirrors are provided. These mirrored surfaces 30 can readily be made of such size as to afford a larger field of vision than can conveniently be provided by means of prisms. To this end, the upper or objective plane reflecting surfaces are made very much larger than the lower or ocular plane reflecting surfaces. The path of the light rays is indicated in Fig. 11 by arrowed lines.

The shutter design is as follows: The four-pole synchronous motor 21 carries on its frame the shutter casing 23. This casing is supported at its outer end by the arm 24 (see Fig. 6), which is integral with the motor supporting ring 15a (which in turn is integral with the arm 15). Mounted on the motor shaft is the cylindrical shutter 42 (seen in section in Figs. 7 and 11). This shutter it not supported at its outer end, but terminates in the knob 26, used for phasing purposes. As is well-known, a stereofluoroscope will give either a "stereoscopic" or a "pseudostereoscopic" image, according as the shutter is phased to admit light induced by the right-hand focal spot to the left eye and that induced by the left spot to the right eye, or vice versa. As the former case introduces grave distortions, the latter is preferred (and is the subject of the considerations based on Fig. 1). If the motor should happen to so step into phase as to give the former case, slight pressure on knob 26 will cause it to "slip a pole" and correct this.

The shutter 42 is pierced with four rectangular openings in the manner indicated in Fig. 1, one pair of openings being offset by 90° on the circumference of the shutter tube with respect to the other pair. The action of the shutter with respect to one cycle of alternating current is illustrated in Fig. 12. This diagram is self-explanatory. The curve of fluorescent intensity is obtained in the following manner: A small sample of the fluorescent screen to be used is glued to a disc (near its periphery) rotating on the shaft of a four-pole synchronous motor operated at the frequency to be employed. X-rays from a tube running under conditions similar to those of the stereofluoroscope are allowed to fall on the rotating disc. There then appear two quite well defined regions on the periphery of the disc within which the fluorescence of the screen sample is distinctly visible. This angle of visibility is measured and the opaque arc of the shutter is designed to match it.

The feasibility of the cylindrical shutter design which is part of my invention depends on the fact that there are finite intervals of invisibility of the screen between succeeding half-cycles, during which the illumination is below the threshold of vision. These intervals are due partly to the fact that X-ray intensity is nearly proportional to the square of the sinusoidal applied voltage. The voltage sufficient to excite visibility on the screen is thus not attained until a considerable fraction of the half cycle has elapsed. If it were not for the effectively dark intervals, the fluorescent image would not appear uniformly brilliant from top to bottom, because of the passage of the opaque shutter portions into the field of view at the back side of the shutter. The foregoing considerations hold for practically any X-ray intensity, since the visibility of the unwanted image at the moment of cut-off or opening depends on the degree to which the eye has already been excited by the proper images just previous.

The cylindrical shutter design presents the great advantage of easy adaptability to the eyes and the bridge of the nose. It enables very close approach of the eyes to the shutter mechanism, thus affording a wide angle of vision while at the same time allowing for proper proportioning of light and dark intervals.

An embodiment of the duplex X-ray tube which forms a part of this invention is shown in Figs. 4 and 8. The targets 2 are sealed into the glass envelope 1 in the usual manner. The cathodes 3 are of conventional design. However, one cathode terminal takes the form of the stem 4, which is affixed to the opposite target by means of the set-screw 4a. The other terminal (which is insulated in any suitable manner from 4) is indicated schematically by line 10. This passes out through a seal adjacent to the target in the manner shown in Fig. 4. The target faces are turned away from mutual parallelism just enough to permit the cone of X-rays from each focal spot to illuminate the required field on the screen. The cathodes are placed as near to their respective targets as possible, consistent with complete illumination of the screen. The proximity of the bell-shaped cathode shields the glass envelope from bombardment by electrons reflected and diffused after collision with the target. Such electrons otherwise tend to build up charges on the glass wall which might eventually cause puncture of the glass. Moreover, due to the Hittorf effect, the tube will operate on less rigid vacuum requirements if cathode and anode are very close together.

As the cathode is supported by and electrically connected to the opposite anode, the requisite number of glass seals is reduced to a minimum. Moreover, the axial arrangement of all parts affords great simplicity in manufacture.

A most important feature of this tube design is that it utilizes to the full the potential developed by the high-tension transformer, due to placing one of the cathode terminals at the potential of the opposite target. Were this not the case, twice the amount of secondary winding would be required on the high-tension transformer. This would be far more expensive than the use of two distinct filament secondaries, as required in connection with the present invention (see wiring diagram of Fig. 4).

The application of aperture stops in the present invention is illustrated schematically in Fig. 9. In the first half of this figure the stops are shown in nearly closed position, in the second half fully opened. These stops 41 may be operated in the conventional manner (by means of levers connected to knobs in front of the apparatus, shown at 17 in Fig. 4). In the present invention two sets of stops, one for each X-ray source, are employed. The inner stops of each pair overlap fully in the wide open position. This is required by practical space limitations. The X-ray beams should be focused on the middle of the screen, as indicated by the dotted lines in the figure; the fields of the two beams then overlap completely, as required for proper stereoscopy.

A most important feature of the present invention as a whole is that it provides in practical form distortionless stereoscopic projection. All the novel elements described and illustrated contribute essentially toward this end. The ultimate object in the elimination of distortion is to enable the exact measurement of the position of objects within the body being viewed, as well as their dimensions in breadth and depth.

I provide for such measurement in the calipering arrangement 18, 19, shown in Figures 4 and 6. Reference numeral 18 indicates a rod attached to the frame of the screen 11. The two objects 19 are swivelling caliper feelers of the type commonly used on machine-shop height gauges. As is well known, such feelers may be adjusted for length and swiveled in all directions on loosening the single thumbnut which serves to secure them to the supporting rod. For complex determinations additional feelers and supporting rods may be employed. The image appears in space before the screen. It is a simple matter to set the feeler tip on any point in the image; a plurality of such settings will serve to fix with great accuracy the dimensions and position of any object or series of objects within the body being studied. The human eyes are endowed with a very refined spatial sense, and the determination by the hand of a position in space does not depend on the sense of touch. The caliper rods need not necessarily be affixed to the screen frame; it suffices for the purposes of the invention that they be affixed to any convenient portion of the apparatus. The swivelling feeler supports might also be attached to some part of the machine without the interposition of rods 18. Also, within the scope of the invention, other measuring devices than those here suggested might be so attached to the machine as to be interposed in the image field. The essential feature is that the measuring arrangement be a part of the stereofluoroscopic apparatus, that it be adapted to contact portions of the image before the screen, and that, such contacts once established, distances may be measured or read off after the lights in the observing room have been turned on and the image has disappeared.

The importance of such accurate determinations in fluoroscopic images as are made possible and practicable by the present invention is self-evident. For example, the precise location of a foreign object in the human body at a moment's notice will greatly facilitate the work of physician and surgeon.

It is to be understood that the scope of my invention is not limited to the particular combination of elements herein set forth. In particular, the term "shutter" is to be understood broadly in connection with my invention. Any device adapted to select at the proper moment the image to be viewed by a given eye and to exclude from the other eye the same image, and vice versa, falls within the broader meaning intended in certain of the appended claims. I therefore use therein the term "image selector", as covering broadly all such devices, including shutters of the general type herein described. The term "screen" hereinafter employed refers to such fluorescent screens as are commonly employed in the art and to any devices which serve a similar purpose. The term "interpupillary compensator" is self-explanatory, and is to be understood in its broadest sense.

The principles of stereofluoroscopic apparatus, particularly with respect to image selectors acting in synchronism with the X-ray sources, are understood in the art, and need not be further set forth here. It is of course assumed that selector and sources are connected to a common source of alternating current.

Reference is hereby made to an article entitled "The technic of stereofluoroscopy" in the magazine "Radiology" dated December 1932 for a more extended explanation of the mathematical and technical features set forth in these specifications. The content of this article is to be considered as a supplementary part of these specifications although the article is not essential for completeness of disclosure.

I claim:

1. A stereofluoroscopic apparatus comprising: two X-ray sources; supporting means for said X-ray sources; a fluoroscopic screen positioned to receive radiations from said sources; supporting means secured to said screen and comprising a movable arm pivotally secured to said first-named supporting means; an image selector positioned for viewing images on said screen produced by said radiations; supporting means secured to said selector and pivotally secured to said movable arm; and link means connecting said selector supporting means and said first-named supporting means in a parallelogram arrangement whereby the ratio of selector-screen distance to source-screen distance is maintained constant during movement of said screen toward and away from said X-ray sources.

2. The invention set forth in claim 1, said link means being provided with connection to said screen whereby said screen is maintained in a parallel position with respect to said two X-ray sources during movement thereof toward and away from said sources.

3. The invention set forth in claim 1, said screen being pivotally disposed on said movable arm, and said link means being pivotally secured to said screen to position said screen in parallel relation to said two X-ray sources upon movement of said movable arm to cause said screen to be moved toward or away from said sources.

4. In a stereofluoroscopic apparatus, the combination comprising: two X-ray sources having their focal spots spaced from one another; a screen positioned to receive X-rays from both of said sources; a binocular image selector positioned for viewing said screen; and an interpupillary compensator associated with said image selector adapted to give the eyes of an observer an optically effective virtual separation equal to the inter-focal spacing of said sources.

5. The combination set forth in claim 4, said interpupillary compensator comprising: two spaced pairs of reflecting surfaces, the reflecting surfaces of each pair comprising an objective reflecting surface and an ocular reflecting surface disposed in parallel planes, the objective reflecting surfaces of each of said pairs being positioned to receive light along two spaced axes from said screen and reflect the same toward the respective ocular reflecting surfaces and said ocular reflecting surfaces being positioned to direct said light along two spaced axes, respectively parallel to said first-named axes to the respective eyes of an observer, and comprising in addition, means for altering the inter-axial spacing of said ocular reflecting surfaces while maintaining the inter-axial spacing of said objective reflecting surfaces constant.

6. The combination set forth in claim 4, said interpupillary compensator comprising a binocular system of four mirrors arranged in two spaced pairs, the mirrors of each pair comprising respectively an objective mirror and an ocular mirror disposed in opposing relation and in parallel planes, said two mirrors of each pair serving to define an axis of view; and comprising in addition, means for varying the inter-axial spacing of said ocular mirrors while maintaining the inter-axial spacing of said objective mirrors constant.

7. A stereofluoroscopic apparatus comprising: two spaced X-ray sources; a fluoroscopic screen positioned to receive radiations from said sources; means for alternately energizing said X-ray sources with alternate half-waves derived from a common source of alternating current to cause alternate visible excitation of said screen by each of said sources during a portion of the half-wave excitation thereof while providing blank periods between alternate visible excitations of said screen during which the intensity of radiation received by said screen is below the threshold value for visibility; means for binocular observation of said screen comprising movable shutter means disposed between the observer's eyes and the screen; and means for moving said shutter means to positions alternately fully masking and fully unmasking said screen to each eye in synchronism with and throughout substantially the entire period of alternate visible excitations of said screen and in stereoscopic relation and for moving said shutter means from masking position to unmasking position during one of said blank periods and for moving said shutter from unmasking position to masking position during the succeeding blank period.

8. An image selector for use in stereofluoroscopic observations in conjunction with a fluoroscopic screen and two spaced and alternately energized X-ray sources, comprising: a shutter casing; a shutter rotatably mounted within said casing and provided with two axially spaced pairs of openings in the side walls thereof, the openings of each pair being diametrically opposite and axially alined with each other and the two pairs of openings being disposed at 90° to each other with respect to the rotation of said shutter; means for synchronously rotating said shutter with respect to the alternate energization of said two X-ray sources so as to cause said respective pairs of openings to alternately aline in viewing relation with respect to said screen, said casing being provided with axially spaced aperture means positioned to register with the respective pairs of openings in the shutter when in said viewing relation; and an interpupillary compensator associated with said image selector adapted to give the eyes of the observer an optically effective virtual separation equal to the interfocal spacing of said X-ray sources.

9. An image selector for use in stereofluoroscopic observations in conjunction with a fluoroscopic screen and two spaced and alternately energized X-ray sources, comprising: a shutter casing; a shutter rotatably mounted within said casing and provided with two axially spaced pairs of openings in the side walls thereof, the openings of each pair being diametrically opposite and axially alined with each other and the two pairs of openings being disposed at 90° to each other with respect to the rotation of said shutter; means for synchronously rotating said shutter with respect to the alternate energization of said two X-ray sources so as to cause said respective pairs of openings to alternately aline in viewing relation with respect to said screen, said casing being provided with axially spaced aperture means positioned to register with the respective pairs of openings in the shutter when in said viewing relation; and an interpupillary compensator comprising two spaced pairs of reflecting surfaces, the reflecting surfaces of each pair comprising an objective reflecting surface and an ocular reflecting surface disposed in parallel planes, the objective reflecting surfaces of each of said pairs being positioned to receive light along two spaced axes from said screen and reflect the same toward the respective ocular reflecting surfaces and said ocular reflecting surfaces being positioned to direct said light along two spaced axes respectively parallel to said first-named axis to the respective eyes of the observer; and means for altering the inter-axial spacing of said ocular reflecting surfaces while maintaining the inter-axial spacing of said objective reflecting surfaces constant, the respective ocular reflecting surfaces being disposed in position to register with respective pairs of openings in said shutter.

10. An electrical circuit for use in stereofluoroscopy, comprising: two separate X-ray sources provided with thermionic cathodes; a high potential transformer provided with an energized primary and with a secondary electrically connected to said X-ray sources and having an electrically central portion maintained at substantially ground potential, an alternating current ammeter inserted in series with said secondary in said ground potential portion for indicating the root mean square value of the sum of the two currents supplied to said two X-ray sources and a direct current type ammeter located in said ground potential portion in series with said first-named ammeter for indicating the arithmetical difference between the average currents supplied to said two X-ray sources, said first-named ammeter indicating the total energy dissipated in the two X-ray sources, and said second-named ammeter indicating the degree of inequality of the energy dissipated in the two X-ray sources.

JESSE W. M. DU MOND.